US011952644B2

(12) United States Patent
Popov et al.

(10) Patent No.: US 11,952,644 B2
(45) Date of Patent: Apr. 9, 2024

(54) REMELTING PLANT AND METHOD FOR OPERATING A REMELTING PLANT

(71) Applicant: ALD Vacuum Technologies GmbH, Hanau (DE)

(72) Inventors: Ivaylo Popov, Hanau (DE); Ulrich Biebricher, Niddatal (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 916 days.

(21) Appl. No.: 16/968,340

(22) PCT Filed: Feb. 6, 2019

(86) PCT No.: PCT/EP2019/052948
§ 371 (c)(1),
(2) Date: Aug. 7, 2020

(87) PCT Pub. No.: WO2019/158419
PCT Pub. Date: Aug. 22, 2019

(65) Prior Publication Data

US 2020/0392603 A1 Dec. 17, 2020

(30) Foreign Application Priority Data

Feb. 14, 2018 (DE) ......................... 102018103312.5

(51) Int. Cl.
*C22B 9/18* (2006.01)
*F27D 11/10* (2006.01)
*H05B 7/10* (2006.01)

(52) U.S. Cl.
CPC ................ *C22B 9/18* (2013.01); *F27D 11/10* (2013.01); *H05B 7/10* (2013.01)

(58) Field of Classification Search
CPC .............. C22B 9/18; F27D 11/10; H05B 7/10
(Continued)

(56) References Cited

U.S. PATENT DOCUMENTS 3,689,680 A 9/1972 Reimpel et al.
3,930,531 A 1/1976 Frehser et al.
(Continued)

FOREIGN PATENT DOCUMENTS

DE 2425032 A 12/1974
DE 2930354 A1 2/1981
(Continued)

OTHER PUBLICATIONS

International Search Report dated Mar. 25, 2019, prepared in International Application No. PCT/EP2019/052948.

*Primary Examiner* — Jessee R Roe
*Assistant Examiner* — Michael Aboagye
(74) *Attorney, Agent, or Firm* — Barnes & Thornburg LLP; Ryan L. Marshall

(57) ABSTRACT

The invention relates to a remelting plant comprising a furnace chamber (50), which can be positioned over a crucible (60) of a melting station, an electrode rod (48), which by way of a lead-through (52) can be inserted or is inserted in the furnace chamber (50), in order to contact a consumable electrode (58), and a guide column (30), on which an electrode rod carriage (40) that is fixed-ly connected to the electrode rod (48) is guided in an axially movable manner, in order to move the electrode rod (48) in relation to the furnace chamber (50), and on which a chamber carriage (38), which is connected or can be connected to the furnace chamber (50), is guided in an axially movable manner, in order to move the furnace chamber (50). The guide column (30) is articulatedly connected at a first end to a rotary column (18) such that the guide column (30) can be inclined in re-lation to the rotary column (18) and can be rotated together with the rotary column (18) about the axis of rotation (24) of the rotary column (18). The guide column (30) has in the region of the first end a weighing
(Continued)

device (36), which is preferably attached to the rotary column (18).

17 Claims, 1 Drawing Sheet

(58) Field of Classification Search
USPC ...... 266/44, 200; 373/36, 41, 50, 52, 69, 94, 373/100, 72, 73, 51, 54
See application file for complete search history.

(56) References Cited

U.S. PATENT DOCUMENTS

| | | | | | |
|---|---|---|---|---|---|
| 4,194,078 | A * | 3/1980 | Thomas | C22B 9/18 | 373/50 |
| 4,280,550 | A * | 7/1981 | Roberts | B22D 23/10 | 373/52 |
| 4,336,924 | A * | 6/1982 | Day | C21D 1/64 | 266/119 |
| 5,260,966 | A * | 11/1993 | Schottlaender | H05B 7/102 | 373/67 |
| 5,274,662 | A * | 12/1993 | Krepel | F27D 21/0035 | 373/67 |
| 8,790,569 | B2 * | 7/2014 | Reali | F27D 11/10 | 266/200 |
| 9,841,366 | B2 | 12/2017 | Werner et al. | | |
| 2016/0113073 | A1 | 4/2016 | Popov et al. | | |
| 2017/0208653 | A1 * | 7/2017 | Iob | F27B 3/28 | |

FOREIGN PATENT DOCUMENTS

| | | | | |
|---|---|---|---|---|
| DE | 102013007394 | A1 | 10/2014 | |
| DE | 102016100372 | * | 7/2017 | F27D 11/10 |
| DE | 102016100372 | A1 | 7/2017 | |
| EP | 3002534 | A1 | 6/2016 | |
| RU | 2613004 | C2 | 3/2017 | |
| SU | 794387 | A1 | 1/1981 | |
| SU | 932262 | A1 | 5/1982 | |

* cited by examiner

REMELTING PLANT AND METHOD FOR OPERATING A REMELTING PLANT

This application is a National Stage application of International Application No. PCT/EP2019/052948, filed Feb. 6, 2019. This application also claims priority under 35 U.S.C. § 119 to German Patent Application No. 10 2018 103 312.5, filed Feb. 14, 2018.

The present invention relates to a remelting plant for remelting metallic materials being in the form of an electrode as well as a method for operating such an electrode remelting plant.

Such remelting plants and/or melting plants serve to improve the properties of metallic materials and are in particularly used for conducting a vacuum arc remelting process or an electrode slag remelting process. In both of these processes a metallic material which has to be processed and is in the form of an electrode (consumable electrode) is contacted by an electrode rod of the remelting plant and is moved or vertically displaced into the direction of a crucible of a melting station. During such processes the electrode is continuously consumed, wherein the remelting process is often controlled by means of a weighing device in accordance with the changing weight of the consumable electrode. The consuming of the electrode is performed in a closed space which is limited by the crucible of a melting station and a furnace being of the remelting plant positioned above the crucible. For the positioning of the furnace over a crucible of a melting station and releasing the crucible for charging the plant after the completion of the remelting process the furnace is also designed such that it can be moved and/or displaced vertically in relation to the crucible. Furthermore, often, remelting plants are envisaged for being used with more than one melting station.

For changing the height of or vertically displacing an electrode rod and a furnace, in DE 10 2016 100 372 A1 a remelting plant is proposed in which the electrode rod and the furnace each are fixed on one traverse member guided between two columns of a gantry. Each of the traverse members comprises a spindle drive for being able to be moved independently of each other. The electrode rod and the furnace are arranged above a frame on which several crucibles are displaceably mounted. Although the crucibles can be moved to be positioned under the furnace and the electrode rod, a challenge is the centering of the electrode in relation to the assigned crucible.

Document DE 2 425 032 A1 describes a remelting plant with a guide column on which an electrode rod carriage is guided in a movable manner for adjusting the height of an electrode rod. Furthermore, on the same guide column a lifting device is provided for moving up and down a furnace over a crucible. A crucible or a mold is arranged on a block carriage for being pulled out of the plant after the completion of the remelting method.

Furthermore, document DE 29 30 254 A1 discloses a remelting plant with a supporting column on which a carriage for holding an electrode and a carriage for holding a chill-mold are fixed. During consuming of the electrode, the chill-mold is continuously lifted. By means of a trolley on which the chill-mold is arranged, after the completion of the remelting method, the chill-mold together with the remelted metal block can be pulled out of the remelting plant.

Also in the case of the remelting plants of documents DE 2 425 032 A1 and DE 29 30 254 A1 there is one problem, namely the centering of the electrode in relation to the mold being positioned below it or to the crucible being positioned below it.

Furthermore, document EP 3 002 534 A1 describes a remelting plant which comprises a weighing cell for weighing the consumable electrode during the remelting process. So, the consumable electrode according to its consumption can be fed into a crucible which is arranged in the plant rack. The weighing cell is installed on a plant rack and carries a platform on which a linear drive for the electrode rod and a holder for a high current cable are arranged. However, a disadvantage of this remelting plant is that it can only be used with a crucible being arranged in the plant rack. In addition, it is only possible in a limited extent to center the electrode in the crucible in an adjustable manner.

For being able to center the electrode in a crucible, in a remelting plant which is known from practice an electrode rod is provided comprising an outer sheath in which the force and current transmitting inner part of the electrode rod is held without contact with respect to the outer sheath. So, the inner part can laterally be moved within the sheath for centering a with the inner part contacted electrode in the crucible. A weighing device with three weighing cells is provided between the electrode rod and a slide that carries the electrode rod and can be moved in vertical direction. However, a disadvantage of this remelting plant is the large outer diameter of the electrode rod arrangement and the required installation space. In addition, during the remelting method impurities may deposit in the free space between the sheath and the inner part of the electrode rod, which may end up in the melt or after unblocking of the crucible in the environment.

Furthermore, from practice a remelting plant is known which comprises a weighing device with several weighing cells being arranged on a top cover of a furnace. The weighing device carries an electrode rod extending into the furnace by way of a lead-through. A disadvantage of this remelting plant is that for charging the remelting plant it is necessary to lift the furnace together with the plant components which are attached on it so that a relatively large plant height as the sum of the length of the electrode rod, the weighing device, the furnace, the electrode and the depth of the crucible results.

An object underlying the invention is to provide a remelting plant with a weighing device which has a low plant height and allows centering of an electrode in a crucible. In addition, an electrode rod of the weighing device should have a small diameter.

This object is solved by a remelting plant with the features of patent claim 1 and a method with the features of patent claim 11. Further possible embodiments will become apparent from the dependent patent claims 2 to 10 as well as the description below.

A remelting plant according to the present invention comprises a furnace which can be positioned over a crucible of a melting station as well as an electrode rod which is insertable or is inserted into the furnace via a lead-through (52), in order to contact a consumable electrode or an electrode which is to be remelted. Furthermore, the remelting plant comprises a guide column on which an electrode rod carriage that is fixedly connected to the electrode rod is guided in an axially movable manner, in order to move the electrode rod relative to the furnace, and on which a furnace carriage that is connectable or connected with the furnace is guided in an axially movable manner, in order to move the furnace. The guide column of the remelting plant is articulatedly connected at a first end to a rotary column such that the guide column can be tilted in relation to the rotary column and can be rotated together with the rotary column about an axis of rotation of the rotary column. The guide column comprises a weighing device in the region of the first end. The weighing device is preferably attached to the rotary column. In particular, it may be possible that the guide column at the first end is pivotably connected to the rotary column by at least two axis which extend crosswise to one another and can thus be tiltable in at least two different directions.

In other words, in the invention it is envisaged that the whole furnace head system of the remelting plant which at least comprises the guide column, the electrode rod carriage, the electrode rod, the lead-through, the furnace carriage and preferably the electrode as well as the furnace (chamber), can be rotated with the rotary column about its axis of rotation by means of the rotationally fixed connection of the guide column with the rotary column with respect to the axis of rotation of the rotary column. Thus, the whole furnace head system can be moved by rotating the rotary column from a crucible of a first melting station to a further crucible of at least one second melting station. At the same time, the whole furnace head system can be inclined by inclining the guide column in relation to the rotary column by means of the articulated connection. Thus, an electrode which is contacted and/or held by the electrode rod can be centered in the assigned stationary crucible in a simple manner by tilting the whole furnace head system by means of tilting the guide column. However, in an embodiment of the invention, an inclination of the furnace which is also caused through this can be compensated, for example, by means of a furnace gimbal between the furnace carriage and the furnace which is explained in more detail below with respect to the corresponding embodiment. In an embodiment, the furnace carriage can also be detachably connected with the furnace so that in the case of a detached or separated connection the inclination/tilting of the guide column and thus the furnace carriage is not transferred to the furnace. Also this is explained in more detail below with respect to the corresponding embodiment.

By the axial movability of the electrode rod carriage and the furnace carriage along a longitudinal axis of the guide column the electrode rod and the furnace are each movable in this direction. Thus, the electrode rod and the furnace are vertically displaceable in their height relative to a ground and a crucible independently of each other. For changing the melting station, the electrode rod and the furnace need to be lifted independently of each other only so far that a new electrode which has to be contacted can be arranged below them and a collision during the rotation of the furnace head system to the further melting station is avoided. Since the electrode rod carriage and the furnace carriage are axially moveable relative to each other, the electrode rod and the electrode rod carriage do not need to be displaced therewith during the lifting of the furnace so that the total height of the remelting plant can be kept low. The lifting of the furnace can also be described as an axial movement of the furnace carriage into the direction of a second end of the guide column which is opposite with respect to the first end. At the same time, in the case of the remelting plant according to the present invention it is possible to keep the diameter of the electrode rod relatively low, since it does not require the formation of an inner and outer sheath.

The arrangement of the weighing device in the region of the first end of the guide column, thus in the region of the articulated connection between the guide column and the rotary column, makes it possible to weigh all components of the remelting plant that are carried by the guide column during the remelting process. Therefore, friction forces between the components which are moved relatively to each other do not influence the measuring result. The changing weight of the consumable electrode can thus be precisely measured so that an exact process control by repositioning the electrode in the direction towards the crucible according to the changing weight of the electrode is achieved.

In an embodiment of the remelting plant the guide column can be articulatedly connected to the rotary column by a ball joint. The guide column can rest on the ball joint and can be carried by it. Basically, the ball joint allows a tilting of the guide column in an arbitrary direction.

The ball joint can be configured such that it at least partially encompasses the weighing device. By the preferably fixed attachment of the ball joint encompassed by the weighing device on the rotary column the rotational movement of the rotary column about the axis of rotation can be transferred to the guide column. The weighing device may have the design of a weighing cell, in particular of a single weighing cell.

According to an embodiment of the remelting plant it is possible that the guide column in a non-inclined/non-tilted state substantially extends parallel to the rotary column and is laterally spaced from it. In this development, the rotary column is different from the longitudinal axis of the guide column.

In an alternative embodiment, instead of a ball joint, for example, a cardan joint may be provided between the guide column and the rotary column. Furthermore, the guide column may be arranged above the rotary column, wherein the longitudinal axis of the guide column and the axis of rotation and/or longitudinal axis of the rotary column correspond to each other.

In a further embodiment of the remelting plant the guide column may have a free second end opposite to the first end, which is operatively connected with a drive device for tilting the guide column about the articulated connection. In particular, the drive device for tilting the guide column may be articulatedly attached to the rotary column and may comprise at least one drive element which contacts the guide column in the region of the free second end. For this, the free second end of the guide column may, for example, comprise a head console which projects at least partially beyond the base area of the guide column. The drive device may, for example, be a so-called X-Y drive comprising two drive elements being movable in two directions perpendicular to each other and horizontal with respect to the drive device. By moving the drive elements the free second end of the connected guide column can be moved together with the drive elements. Since the guide column at the opposite first end is articulatedly—but apart from that not movably—connected to the rotary column, this basically horizontal movement of the free second end results in an inclination/tilting of the guide column. By the articulated attachment of the drive device on the rotary column and the attachment of the drive elements on the guide column it is possible to tilt the drive device together with the guide column.

In an embodiment of the remelting plant the lead-through may be connected with the furnace by way of bellows. This allows a vacuum- and/or gas-tight insertion of the electrode rod into the furnace. In addition or in an alternative, the lead-through may be rigidly connected with the furnace carriage and may be movable together with it. Thus, it can be guaranteed that during the movement of the furnace by means of the furnace carriage the distance between the furnace and the lead-through does not become too large and that, for example, the interjacent bellows are not damaged. The rigid connection of the lead-through with the furnace carriage can be realized by means of a stiff cross connection which extends between the lead-through and the furnace carriage and which is fixedly connected with both. Since the lead-through of the electrode rod is connected with the furnace carriage by way of the cross connection, the weight of which by way of further components such as a carriage drive device and a drive spindle is carried and thus measured by the weighing device, friction forces at the lead-through are effective as internal forces in the weighed part of the remelting plant and thus do not influence the weighing result.

In an embodiment of the remelting plant the furnace may comprise a gimbal via which the furnace carriage is detachably connected or can detachably be connected with the furnace. When the guide column with at least the carriages guided thereon, the electrode rod, the lead-through and the electrode is tilted about the articulated connection for centering the electrode in the assigned crucible, this tilting with respect to the furnace can be compensated by the gimbal. So, the furnace remains in a substantially vertical position despite the inclination of the guide column. The gimbal may be attached to the furnace, in particular at an outer peripheral area of the furnace. By an axial movement of the furnace carriage into the direction of the free second end of the guide column, i.e. during operation vertically upwards, the furnace carriage can at least be partially connected with the gimbal. Thus, when the furnace carriage is further moved into the direction of the free second end of the guide column, the furnace can be lifted off from a crucible of a melting station. Similarly, by an axial movement of the furnace carriage into the direction of the first end of the guide column the furnace can be put on a crucible of a melting station so that the furnace space can be closed in a vacuum- and/or gas-tight manner.

After putting the furnace on the crucible, the furnace carriage can further be moved into the direction of the first end of the guide column, whereby the connection between the furnace carriage and the gimbal can be detached or is separated. Then, the furnace is only connected with the lead-through by way of the bellows. Since after the detachment of the connection to the furnace carriage the furnace is no longer carried by the guide column, also the weight of the furnace does not longer have an effect on the weighing device, and is thus not measured during the process control.

In contrast, the connection between the electrode rod and the electrode rod carriage is a fixed connection. This fixed connection is arranged outside, more precisely in an installed condition, above the furnace. The fixed connection may, for example, be a screw or clamping connection between the electrode rod carriage and the electrode rod.

According to an embodiment of the remelting plant the electrode rod carriage and the furnace carriage each may comprise a carriage drive device for axially moving the respective carriage along the guide column. The separate carriage drive devices for both carriages allow movements independently of each other. Each carriage drive device may have the design of a spindle drive. A drive spindle of the carriage drive devices may preferably be arranged parallel with respect to the guide column and at an end can be mounted hanging from the head console of the guide column.

In an embodiment the remelting plant may further comprise a support column which is rigidly connected or can rigidly be connected with a ground and which substantially extends parallel to the rotary column and is laterally spaced from it. In this embodiment the rotary column can at a first rotary column end rest on the ground or a platform rotatably about the axis of rotation by means of an axial bearing and can be rotatably supported about the axis of rotation at a second rotary column end which is opposite with respect to the first rotary column end in a radial bearing which is arranged at a bar which is rigidly connected with the support column. The bar may have the form of a cross beam which extends substantially in horizontal direction from the support column into the direction of and at least sectionally over the rotary column. The weighing device may, in particular, be arranged in close proximity to the axial bearing, more precisely directly above the axial bearing.

In an embodiment the electrode rod can be connected with an electric power supply by way of a high current cable system comprising a first high current cable, a second high current cable and a third high current cable. The first high current cable can be fixed between the electric power supply and a first cable suspender. The first cable suspender may be attached to the rotary column so that the first high current cable must have a sufficient length so that the rotational movement of the rotary column is not constrained. The second high current cable may be fixed between the first cable suspender at the rotary column and a second cable suspender, wherein the second cable suspender is attached to the guide column. So, a decoupling of the part of the remelting plant which has to be weighed from the part of the remelting plant which has not to be weighed can be achieved. The third high current cable can be fixed between the second cable suspender at the guide column and a third cable suspender, wherein the third cable suspender is attached to the electrode rod. The third high current cable has a sufficient length such that the lowering and lifting of the electrode rod are not constrained. Since the guide column directly or indirectly carries the second cable suspender and the third cable suspender, the third high current cable and its suspenders are weighed by the weighing device so that a movement of the cable by moving the electrode rod does not influence the weighing result. It goes without saying that the first, second and third high current cables each may comprise several conductors or cable harnesses.

According to a further embodiment, each column may have the design of a frame. In this case the high current cable system between the electric power supply and the electrode rod may be arranged within this frame so that the power fields which are generated during the remelting method in the surroundings of the high current cable do not have a negative influence onto the steel components of the remelting plant. This may, in particular, be advantageous, when the remelting plant is an electrode slag remelting plant (ESR plant). Especially in the case of such remelting plants problems due to the alternating current may occur, wherein here it may be possible that plant components which are encompassed by the so-called high current loop are coupled in and heated. In addition, the length of the high current loop and the area thereof enclosed therein may have a negative influence by increasing the reactance of the plant so that the current consumption of the plant increases. By the arrangement of the high current cable system and thus the high current loop within the columns which have the form of a frame, the length of the high current loop and the area thereof enclosed therein can be minimized.

A method according to the present invention for operating a remelting plant, in particular a remelting plant of the above described kind, comprises the steps of:

axially moving an electrode rod carriage which is fixedly connected to an electrode rod along a guide column guiding the electrode rod carriage, in order to move the electrode rod relative to the furnace (50) for contacting an electrode (58), the electrode rod (48) being insertable or inserted in a furnace via a lead-through, and axially moving a furnace carriage which is connected or can be connected with the furnace along the guide column guiding the furnace carriage, in order to move the furnace.

The guide column at a first end is articulatedly connected to a rotary column. The method according to the present invention comprises the further steps of:

positioning the furnace over a crucible of a melting station by rotating the guide column together with a rotary column about an axis of rotation of the rotary column, centering the electrode that is contacted by the electrode rod in the crucible by tilting the guide column relative to the rotary column, and weighing at least the electrode by a weighing device which is arranged in the region of the first end of the guide column and is preferably attached to the rotary column.

Here, the weighing device measures also the weight of the guide column and the weight of the components which are carried by the guide column during the remelting process. Since the weight of the other components, apart from the weight of the electrode, does not change during the remelting process, substantially only the measured weight change has to be evaluated for conducting the process control. The components which are carried during the remelting process by the guide column may in particular comprise the electrode rod carriage, the electrode rod, the electrode, the furnace carriage and the lead-through. A ball joint can be considered as a part of the guide column which is also weighed by the weighing device. In addition, the components which are carried by the guide column during the remelting process may comprise two cable suspenders, a high current cable, a cross connection, a drive of the furnace carriage and/or a drive of the electrode rod carriage.

Although some aspects and features have only been described with respect to the remelting plant, they can accordingly apply to the method for operating a remelting plant as well as to its embodiments.

DESCRIPTION OF THE FIGURE

The present invention should further be explained by means of a schematic FIGURE which shows an embodiment example of a remelting plant.

The remelting plant shown in FIG. 1 comprises a stationary support column 10 which with its lower end is rigidly connected with a ground 12 and extends vertically upwards. At an upper end which is opposite with respect to the lower end the support column 10 comprises a horizontally arranged cross beam 14 which extends beyond the base area of the support column 10. The cross beam 14 is rigidly attached to the support column 10. At an end which faces away from the support column 10, in the cross beam 14 a radial bearing 16 is formed which encloses an upper end of a rotary column 18. Here, the upper end of the rotary column 18 is also referred to as second rotary column end.

Figure 1:
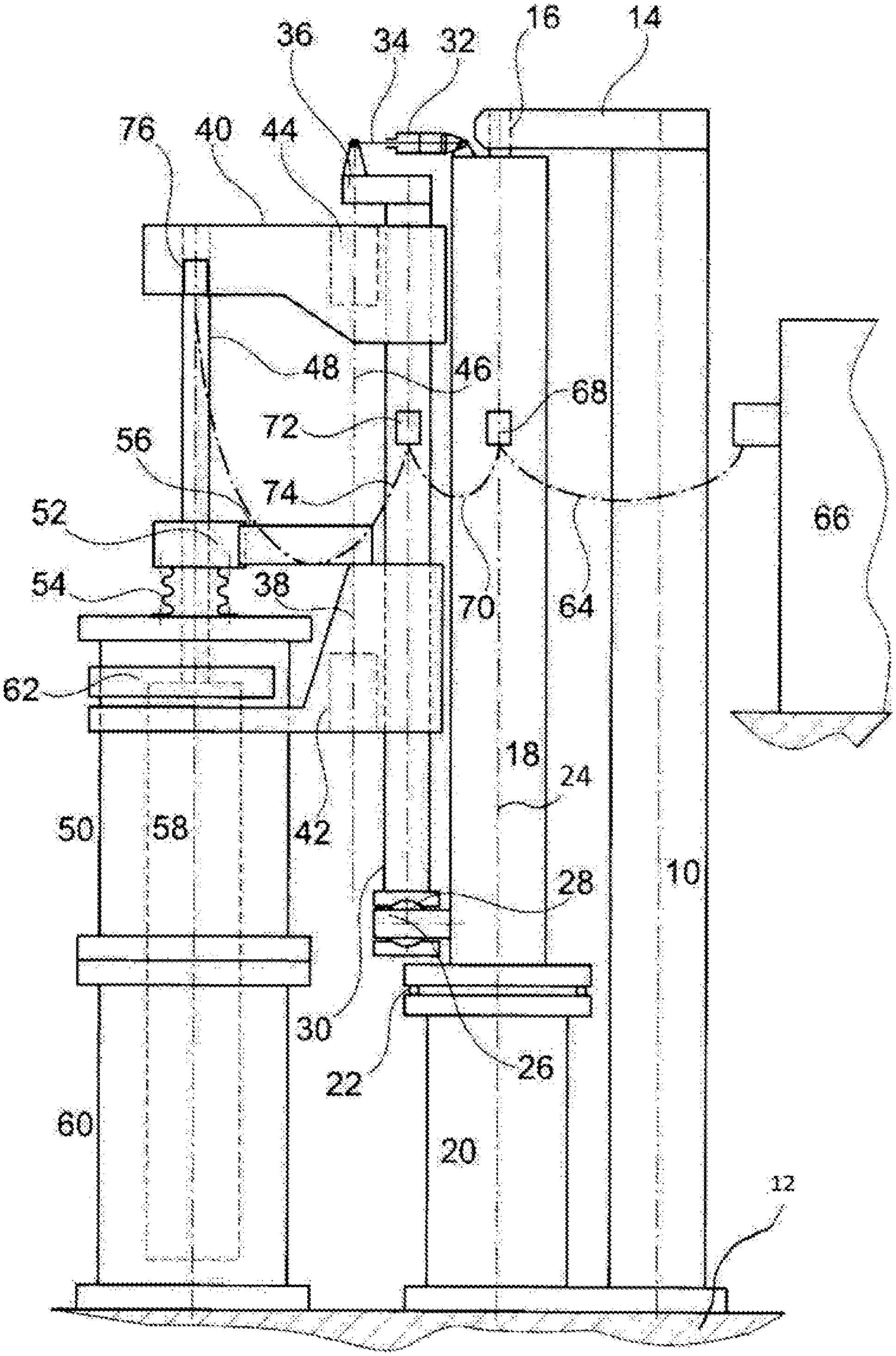

The rotary column 18 is arranged laterally adjacent to the support column 10 and extends in vertical direction parallel to it. In the shown embodiment example, the rotary column 18 is arranged above a platform 20 and is rotatably (about an axis of rotation 24) mounted on this platform 20 at the lower end (the first rotary column end) by way of an axial bearing 22. Here, the axis of rotation 24 corresponds to the longitudinal axis of the rotary column 18 as well as the longitudinal axis of the platform 20. The platform 20 is fixedly connected to the ground 12. Directly above the axial bearing 22 a weighing device 26 in the form of a single weighing cell is attached to the rotary column 18.

A section of the weighing device 26 which is spaced in lateral direction with respect to the support column 18 is at least partially enclosed by a ball joint 28. The ball joint 28 is provided at a lower end (a first end) of a guide column 30 and thus forms an articulated connection between the rotary column 18 and the guide column 30. An upper end (second end) of the guide column 30 has the design of a free end. So, guide column 30 can be inclined about the ball joint 28 in relation to the rotary column 18. In FIG. 1 the guide column 30 is shown in a non-inclined state in which the guide column 30 extends in parallel direction with respect to the rotary column 18 and is laterally spaced from it. Furthermore, by means of the ball joint 28 it is possible to transfer a rotational movement of the rotary column 18 onto the guide column 30 so that the guide column 30 can be rotated together with the rotary column 18 about the axis of rotation 24.

For inclining the guide column 30 about the ball joint 28 and in relation to the rotary column 18, the free second end of the guide column 30 has to be deflected in a targeted manner. For this purpose, a drive device which can be actuated 32 is provided which in the embodiment example shown has the design of an X-Y drive. The drive device 32 comprises two drive elements 34, more precisely an X drive element and a Y drive element. The drive elements 34 can respectively be moved in a direction which is horizontal with respect to the drive device 32, wherein both directions preferably are perpendicular to each other. For inclining the guide column 30, the drive elements 34 are connected to a head console 36 of the guide column 30, while the drive device 32 is connected to the upper end of the rotary column 18. Thus, by moving one or both drive elements 34 the free second end of the guide column 30 can be moved so that the guide column 30 can be inclined. Since by the inclination of the guide column 30 not only the lateral distance between the second end of the guide column 30 and the upper end of the rotary column 18 changes, but also the vertical distance between them, the drive device 32 is articulatedly attached to the upper end of the rotary column 18. Furthermore, the drive elements 34 are articulatedly attached to the head console 36. Thus, the drive device 32 along with the drive elements 34 incline together with the guide column 30 so that a precise inclination of the guide column 30 by actuating the drive device 32 is guaranteed in a simple manner.

On the guide column 30 a furnace carriage 38 and an electrode rod carriage 40 are guided in a movable manner. The furnace carriage 38 is arranged below the electrode rod carriage 40, i.e. between the ball joint 28 and the electrode rod carriage 40. Both carriages 38, 40 can be moved in axial direction and/or along the longitudinal axis of the guide column 30. For this purpose, the furnace carriage 38 comprises a furnace carriage drive device 42 and the electrode rod carriage 40 comprises an electrode rod carriage drive device 44. The carriage drive devices 42, 44 can separately be actuated for being able to move both carriages 38, 40 independently of each other. The carriage drive devices 42, 44 are respectively arranged at or in a recess of the carriages 38, 40 which are assigned to them. Here, the carriage drive devices 42, 44 have the design of spindle drives, wherein their drive spindle 46 is suspended at the head console 36 of the guide column 30 and extends downwards starting from that in parallel direction with respect to the longitudinal axis of the guide column 30. This allows a particularly space-saving design of the remelting plant.

At a section of the electrode rod carriage 40 facing away from the guide column 30 an electrode rod 48 is fixedly attached to the electrode rod carriage 40 by means of a bolted or clamping connection. Therefore, the electrode rod 48 can be moved by an axial movement of the electrode rod carriage 40 together with it. The electrode rod 48 extends vertically downwards from the electrode rod carriage 40 into the direction of a furnace 50 and thus is substantially parallel with respect to the guide column 30.

The electrode rod 48 is inserted in the furnace 50 by way of a lead-through 52. Between the lead-through 52 and the furnace 50 bellows 54 are provided through which the electrode rod 48 extends. These bellows 54 guarantee a vacuum- and gas-tight insertion of the electrode rod 48 in the furnace 50. When the electrode rod 48 is moved by means of the electrode rod carriage 40, then this results in a relative movement to the furnace 50 and the lead-through 52 (as well as the bellows 54). The lead-through 52 is fixedly connected to the furnace carriage 38 by way of a rigid cross connection 56 and can be moved together with it.

The electrode rod 48 contacts and/or holds at its lower end which is spaced from the electrode rod carriage 40 an electrode 58 which is consumed during said remelting process. The electrode 58 is placed in a vacuum- and gas-tight furnace space which is formed by the furnace 50 and a crucible 60 of a melting station. The electrode 58 can be moved by means of the electrode rod carriage 40 by way of the electrode rod 48. So, the consumable electrode 58 can be repositioned for achieving a predetermined melting rate. For this purpose, the changing weight of the consumable electrode is continuously measured with the help of the weighing device 26, and the process is controlled accordingly.

The furnace 50 can be connected with a contacting section of the furnace carriage 38 which extends in the direction of the furnace 50 by means of a gimbal 62. In the state of the remelting plant which is shown in FIG. 1 the furnace 50 is already positioned or put on the crucible 60 of the melting station and forms with it the vacuum- and gas-tight furnace space in which the remelting process takes place. In the state shown the contacting section of the furnace carriage 38 is positioned in a predetermined distance below the gimbal 62 so that there is no direct connection between the furnace carriage 38 and the furnace 50. By a movement of the furnace carriage 38 in an upward direction or into a direction of the second end of the guide column 30, the contacting section of the furnace carriage 38 abuts upon the gimbal 62 so that the furnace 50 can be moved vertically by means of the furnace carriage 38. So, it is possible to lift off the furnace 50, for example after the completion of the remelting process, from the crucible 60 and to unblock it.

For the energy supply of the remelting plant a first high current cable 64 is connected to a high current source 66 and fixed at a first cable suspender 68 which is attached to the rotary column 18. A second high current cable 70 is conductively connected with the first high current cable 64 and extends between the first cable suspender 68 at the rotary column 18 and a second cable suspender 72 which is attached to the guide column 30. A third high current cable 74 is conductively connected with the second high current cable 70 and the electrode rod 48 and extends between the second cable suspender 72 at the guide column 30 and a third cable suspender 76 which is attached to the electrode rod 48. Also the electrode 58 is supplied with high current by way of the electrode rod 48.

The functioning of the remelting plant can be described as follows: starting with the starting position which is shown in FIG. 1, the remelting process is initiated and the electrode 58 is continuously consumed. For this purpose, the electrode rod carriage 40 and the electrode rod 48 held by it and the electrode 58 are positioned in the highest possible starting position in which the electrode rod carriage 40 is arranged below the second free end of the guide column 30. During that the furnace 50 is separated from the furnace carriage 38 and is placed on the crucible 60. The consumable electrode 58 is repositioned in the crucible 60 by a controlled movement of the electrode rod carriage 40 into the direction of the first end of the guide column 30. For this purpose, with the help of the weighing device 26 the changing weight of the consumable electrode is continuously measured, and the process is controlled accordingly. The prevailing friction forces between the carriages 38, 40 and the guide column 30 as well as between the electrode rod 48 and the lead-through 52 do not influence the weighing result, because all these components are carried and weighed by the weighing device 26 and the prevailing friction forces thus are only effective as internal forces in the weighed part of the remelting plant.

When the remelting process at the shown first melting station is completed, the furnace 50 and the electrode rod 48 should be moved to a further melting station. In the further melting station already a new consumable electrode has been prepared and projects upwards from the crucible of this further melting station.

At first, the electrode rod carriage 40 with the electrode rod 48 being attached to it are again moved back upwards into the starting position by means of the electrode rod carriage drive device 44. Subsequently, the furnace carriage 38 is moved upwards into the direction of the second free end of the guide column 30 by means of the furnace carriage drive device 42 so that the contacting section of the furnace carriage 38 becomes connected with the gimbal 62 of the furnace 50. Through a further lifting of the furnace carriage 38 the furnace 50 is lifted off from the crucible 60 of the first melting station. The furnace carriage 38 together with the furnace 50 which is connected with it are further axially moved upwards, until a lower end of the furnace 50, considered in vertical direction, is in a higher position than the projecting end of the new consumable electrode.

The guide column 30 together with the carriages 38, 40 which are guided on it and with the electrode rod 48 and the furnace 50 are moved by rotating of the rotary column 18 about the axis of rotation 24 from the first melting station to the further melting station. Since the furnace 50 ends vertically above the prepared electrode, it is possible to move the furnace 50 over the new electrode without colliding with it. When the electrode rod 48 is positioned above the new electrode, it can be contacted and clamped from the electrode rod 48. For this purpose, in certain embodiments, the electrode rod 48 optionally may slightly be moved downwards.

The furnace carriage 38 is moved downwards so that the furnace 50 which is positioned above the crucible of the further melting station is lowered. A short time before the furnace 50 is put on the crucible of the further melting station, the new electrode is centered in the crucible of the further melting station by actuating the drive device 32 accordingly. For centering the new electrode the drive device 32 inclines the guide column 30 with the carriages 38, 40 which are arranged on it, the carriage drive devices 42, 44 along with drive spindle 46, the electrode rod 48, the lead-through 52 along with cross connection 56 and the new electrode in the desired directions about the ball joint 26.

Here, however, the furnace 50 remains vertically aligned and it is not also inclined, because the gimbal 62 formed between the furnace carriage 38 and the furnace 50 as well as the bellows 54 formed between the furnace 50 and the lead-through 52 substantially compensate the inclination.

After the centering of the new electrode in the further melting station the furnace 50 is put on the crucible of the further melting station by axial movement of the furnace carriage 38 into the direction of the first end of the guide column 30 so that the furnace 50 again forms a vacuum- and gas-tight furnace space with the crucible of the further melting station. Then, the furnace carriage 38 is moved further into the direction of the first end of the guide column 30 by a predetermined distance for detaching or separating the connection between the contacting section of the furnace carriage 38 and the gimbal 62 of the furnace 50. So, during the subsequent remelting process the weight of the furnace 50 is not measured by the weighing device 26, because the furnace 50 and the weighed components are in contact only by way of the bellows 54. The remelting process, including the lowering of the new electrode, is repeated such as described with respect to the first melting station.

LIST OF REFERENCE SIGNS

10 support column
12 ground
14 cross beam
16 radial bearing
18 rotary column
20 platform
22 axial bearing
24 axis of rotation
26 weighing device
28 ball joint
30 guide column
32 drive device
34 drive element
36 head console
38 furnace carriage
40 electrode rod carriage
42 furnace carriage drive device
44 electrode rod carriage drive device
46 drive spindle
48 electrode rod
50 furnace
52 lead-through
54 bellows
56 cross connection
58 electrode
60 crucible
62 gimbal
64 first high current cable
66 high current source
68 first cable suspender
70 second high current cable
72 second cable suspender
74 third high current cable
76 third cable suspender

The invention claimed is:

1. A method for operating a remelting plant, comprising:

axially moving an electrode rod carriage that is fixedly connected to an electrode rod along a guide column guiding the electrode rod carriage, so as to move the electrode rod relative to the furnace for contacting an electrode, the electrode rod being insertable or inserted in a furnace via a lead-through, and axially moving a furnace carriage that is connected or connectable with the furnace along the guide column guiding the furnace carriage so as to move the furnace, wherein the guide column at a first end is articulatedly connected to a rotary column, and wherein the guide column at a free second end which is opposite to the first end is operatively connected with a drive device for tilting the guide column, positioning the furnace over a crucible of a melting station by rotating the guide column together with a rotary column about an axis of rotation of the rotary column, centering the electrode that is contacted by the electrode rod in the crucible by tilting the guide column relative to the rotary column, and weighing at least the electrode by a weighing device that is arranged in a region of the first end of the guide column and attached to the rotary column.

2. A remelting plant, comprising a furnace which is positionable over a crucible of a melting station, an electrode rod which is insertable or is inserted into the furnace via a lead-through, so as to contact a consumable electrode, and a guide column on which an electrode rod carriage that is fixedly connected to the electrode rod is guided in an axially movable manner, so as to move the electrode rod relative to the furnace, and on which a furnace carriage that is connectable or connected with the furnace is guided in an axially movable manner, so as to move the furnace, wherein the guide column is articulatedly connected at a first end to a rotary column such that the guide column is tiltable in relation to the rotary column and is rotatable together with the rotary column about an axis of rotation of the rotary column, wherein the guide column comprises a weighing device in a region of the first end which is attached to the rotary column, and wherein the guide column at a free second end which is opposite to the first end is operatively connected with a drive device for tilting the guide column.

3. The remelting plant according to claim 2, wherein the guide column is articulatedly connected to the rotary column by a ball joint.

4. The remelting plant according to claim 3, wherein the ball joint encompasses the weighing device at least sectionally, the weighing device being formed as a load cell.

5. The remelting plant according to claim 2, wherein in a non-tilted state the guide column substantially extends parallel to the rotary column and is laterally spaced from the rotary column.

6. The remelting plant according to claim 2, wherein the drive device for tilting the guide column is articulatedly attached to the rotary column and comprises at least one drive element that contacts the guide column in a region of the free second end.

7. The remelting plant according to claim 2, wherein the lead-through is connected with the furnace via a bellows and/or is rigidly connected with and movable together with the furnace carriage.

8. The remelting plant according to claim 2, wherein the furnace comprises a gimbal by which the furnace carriage is detachably connectable or detachably connected with the furnace.

9. The remelting plant according to claim 2, wherein the electrode rod carriage and the furnace carriage each comprise a carriage drive device for axially moving the respective carriage along the guide column, wherein each carriage drive device comprises a drive spindle.

10. The remelting plant according to claim 2, which further comprises a support column that is rigidly connected or connectable with a ground, and that extends substantially parallel to the rotary column and is laterally spaced from the rotary column, wherein the rotary column at a first rotary column end is rotatably supported about the axis of rotation on the ground or a platform by an axial bearing and at a second rotary column end opposite to the first rotary column end is rotatably mounted about the axis of rotation in a radial bearing which is arranged at a bar that is rigidly connected with the support column.

11. A remelting plant, comprising a furnace which is positionable over a crucible of a melting station, an electrode rod which is insertable or is inserted into the furnace via a lead-through, so as to contact a consumable electrode, and a guide column on which an electrode rod carriage that is fixedly connected to the electrode rod is guided in an axially movable manner, so as to move the electrode rod relative to the furnace, and on which a furnace carriage that is connectable or connected with the furnace is guided in an axially movable manner, so as to move the furnace, wherein the guide column is articulatedly connected at a first end to a rotary column such that the guide column is tiltable in relation to the rotary column and is rotatable together with the rotary column about an axis of rotation of the rotary column, wherein the guide column comprises a weighing device in a region of the first end which is attached to the rotary column;

the remelting plant further comprising: a support column that is rigidly connected or connectable with a ground, and that extends substantially parallel to the rotary column and is laterally spaced from the rotary column, wherein the rotary column at a first rotary column end is rotatably supported about the axis of rotation on the ground or a platform by an axial bearing and at a second rotary column end opposite to the first rotary column end is rotatably mounted about the axis of rotation in a radial bearing which is arranged at a bar that is rigidly connected with the support column.

12. The remelting plant according to claim 11, wherein the guide column is articulatedly connected to the rotary column by a ball joint.

13. The remelting plant according to claim 12, wherein the ball joint encompasses the weighing device at least sectionally, the weighing device being formed as a load cell.

14. The remelting plant according to claim 11, wherein in a non-tilted state the guide column substantially extends parallel to the rotary column and is laterally spaced from the rotary column.

15. The remelting plant according to claim 11, wherein the lead-through is connected with the furnace via a bellows and/or is rigidly connected with and movable together with the furnace carriage.

16. The remelting plant according to claim 11, wherein the furnace comprises a gimbal by which the furnace carriage is detachably connectable or detachably connected with the furnace.

17. The remelting plant according to claim 11, wherein the electrode rod carriage and the furnace carriage each comprise a carriage drive device for axially moving the respective carriage along the guide column, wherein each carriage drive device comprises a drive spindle.

* * * * *